Dec. 5, 1950          H. K. PERRILL          2,532,370
FINGER NAIL CUTTER
Filed Feb. 13, 1948
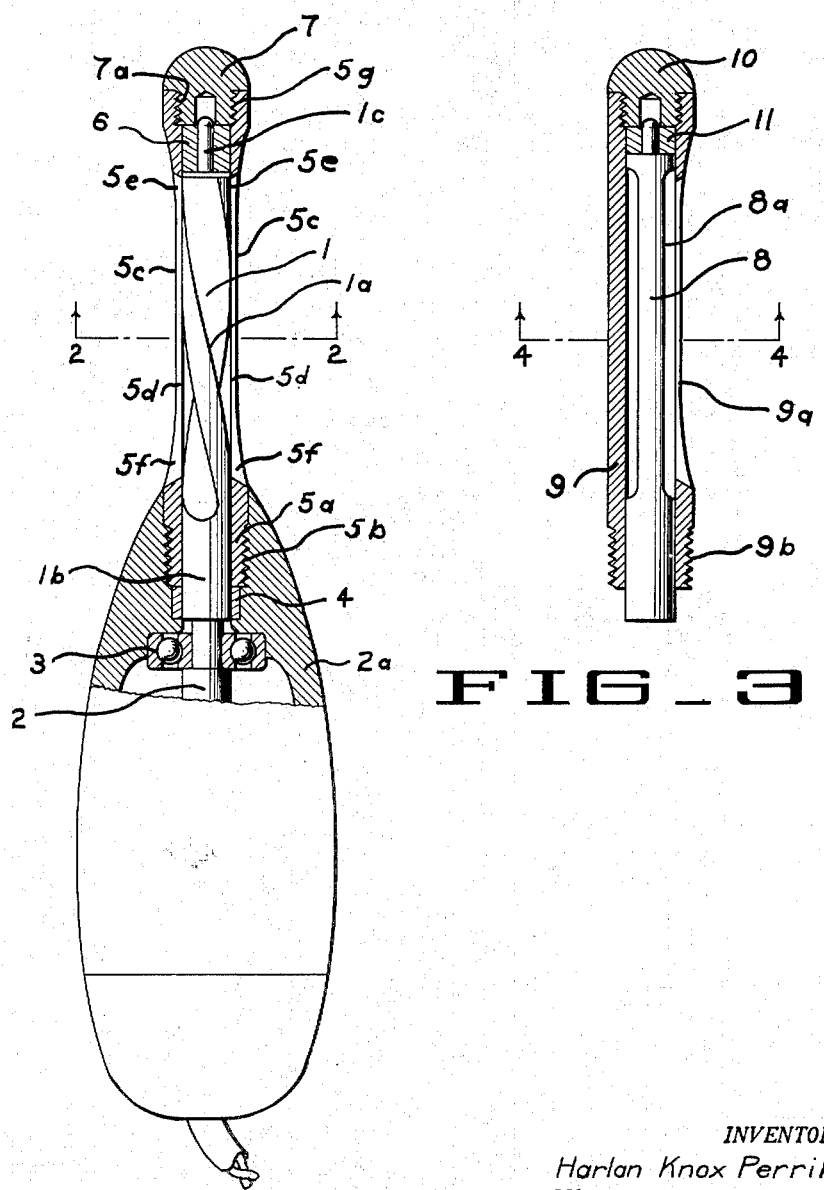
INVENTOR.
Harlan Knox Perrill
BY
Wm. H. Dean
AGENT Patented Dec. 5, 1950

2,532,370

UNITED STATES PATENT OFFICE 2,532,370

FINGERNAIL CUTTER

Harlan Knox Perrill, San Diego, Calif.

Application February 13, 1948, Serial No. 8,136

6 Claims. (Cl. 30—29)

My invention relates to an electric finger nail cutter and the objects of my invention are:

First, to provide a more efficient and uniform operation of cutting finger nails;

Second, to provide a device for cutting finger nails which is very easily handled and light in weight;

Third, to provide a finger nail cutter of this class which is self contained and provides for the cutting of finger nails in various lengths as desired;

Fourth, to provide a device for cutting finger nails which will accommodate a large variety of nails including the nails of various thickness and hardness;

Fifth, to provide a finger nail cutter of this class which includes a cutter casing and a revolving cutter therein which is so protected by the casing that it is very safe in operation and will only cut a very thin object inserted through a slot in the casing; and Sixth, to provide a finger nail cutter of this class which is very simple and economical in construction, efficient in operation and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which Fig. 1 is a longitudinal sectional view of my finger nail cutter showing the revolving cutter member in elevation and showing a portion of the motor in connection therewith in elevation; Fig. 2 is a transverse sectional view taken from the line 2—2 of Fig. 1; Fig. 3 is a longitudinal sectional view of a modified form of my finger nail cutter; Fig. 4 is a sectional view taken from the line 4—4 of Fig. 3.

Similar characters of reference refer to similar parts and portions throughout the several views of the drawings.

The revolving cutter 1 is a helical cutter member having sharp cutting edges 1a following the helical form of the cutter. The normally inner end 1b of this cutter member 1 is connected to the motor shaft 2 mounted in the ball bearing 3 in the motor casing 2a. Pressed in this motor casing 2a is a bushing 4 surrounding the inner end 1b of the revolving cutter 1 at its smooth portion. Abutting this bushing 4 and surrounding the inner end 1b of the revolving cutter 1 is the externally screw-threaded hollow cylindrical portion 5a of the cutter casing 5. The externally screw-threaded portion 5b is engaged by internally disposed threads in the motor casing 2a for holding the cutter casing in secure rigid relationship with the motor casing 2a which forms a handle for my finger nail cutter. The cutter casing 5 is provided with thin sidewalls 5c which are substantially straight and uniform in thickness intermediate opposite ends of the cutter casing 5. The sidewalls 5c being the thinnest portions of the casing 5 are provided with longitudinal slots 5d arranged to receive finger nails. These slots 5d are narrow slots which are only wide enough to accommodate the thickest finger nail which might be inserted therein. The thickness of the cutter casing 5 near the opposite ends of the slotted portions 5d is increased to provide a gauge for cutting finger nails to a greater projecting length than finger nails cut in the slotted portions 5d near the middle of the cutter casing 5. Thus, I have provided for trimming of corners of finger nails as well as the cutting of the nails at varying projected lengths from the cuticle of the finger. It will be noted that the casing thickness at the slotted portions 5d near the outer end 5e thereof are slightly thicker than the middle portion of the cutter casing 5 providing an intermediate cutting gauge while the sidewalls 5f near the opposite end of the cutter casing are substantially thicker than the sidewall portions 5c at the ends 5e. These thickest sidewall portions designated 5f near the inner end of the casing 5 are gradually tapered into the thinner sidewall sections near the middle of the casing 5 toward the front end of said cutter casing. The front end of the cutter casing 5 is provided with an internally screw-threaded portion 5g in which the cap 7 at its externally screw-threaded portions 7a is engaged. The outer bearing 6 is pressed in the extending end of the cutter casing 5 beyond the slotted portions 5d and support the reduced in diameter journal portion 1c of the cutter member 1, all as shown best in Fig. 1 of the drawings.

It will be noted that the helical form of the revolving cutter 1 provides for longitudinal removal of the cuttings toward the forward end of the cutter member and also provides for concurrent centrifugal removal of said cuttings through the slotted portions 5d.

The operation of my finger nail cutter is substantially as follows:

The motor shaft 2 is revolved by a conventional electric motor in the casing 2a and the revolving cutter 1 being fixed to the shaft 2 is rotated in the cutter casing 5. Cutting edges 1a of the revolving cutter 1 passing the slotted portions 5d provide shearing action on finger nails inserted through said slots 5d. If a person desires to cut his finger nails uniformly a short length he rotates the end of his finger about an axis normal to the curvature of the end thereof with his respective finger nail in one of the slots 5d near the middle of the casing 5. If he wishes a slightly longer finger nail he moves the finger up to the end portions 5e of the slots 5d before inserting the same therein. If it is desired to cut finger nails to a long projecting length the finger nails are inserted in the slotted portions 5d at the ends 5f thereof located at the thick-wall portions of the casing 5 which provide a length for cutting gauge of varying degree in accordance with the position of the finger nail longitudinally of the casing 5 which varies in thickness gradually from the ends 5f toward the middle of the casing 5. In operation, the cap 7 provides a longitudinal support for the revolving cutter 1 together with the bushing 6 acting as a journal for the reduced diameter end portion 1c of said revolving cutter 1.

Modified structure as shown in Figs. 3 and 4 of the drawings is provided with a revolving cutter 8 having straight cutting edges 8a revolubly mounted in the cutter casing 9, having a slotted portion 9a similar to the slotted portions 5d hereinbefore described in connection with the structure as shown in Figs. 1 and 2 of the drawings. The cap 10 is similar in construction to the cap 7 hereinbefore described while the bearing 11 is similar in construction to the bearing 6 hereinbefore described. The inner end of the cutter casing 9 is externally screw-threaded at 9b and is readily connected to the motor casing 2a as shown in Fig. 1 of the drawings, in a similar manner to the cutter casing 5 hereinbefore described.

In operation the modified structure as shown in Figs. 3 and 4 of the drawings is similar to the structure shown in Figs. 1 and 2 of the drawings hereinbefore described except that the shearing action of the finger nails by the cutter member 8 is not progressive but continuously parallel to the slotted portion 9a.

Though I have shown and described a particular construction, combination and arrangement of parts and portions I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a finger nail cutter of the class described, a combination of a motor shaft, a revolving blade cutter in connection therewith, a casing surrounding said revolving cutter having slotted portions therein through which finger nails may be projected, the sidewalls of said casing through which slotted portions extend varying in thickness providing a varying gauge for cutting finger nails to different lengths.

2. In a finger nail cutter of the class described, a combination of a motor shaft, a revolving blade cutter in connection therewith, a casing surrounding said revolving cutter having slotted portions therein through which finger nails may be projected, the sidewalls of said casing through which slotted portions extend varying in thickness providing a varying gauge for cutting finger nails to different lengths, said revolving cutter member having helical cutting edges.

3. In a finger nail cutter of the class described, a combination of a motor shaft, a revolving blade cutter in connection therewith, a casing surrounding said revolving cutter having slotted portions therein through which finger nails may be projected, the sidewalls of said casing through which slotted portions extend varying in thickness providing a varying gauge for cutting finger nails to different lengths, said revolving cutter member having helical cutting edges, the outer end of said revolving cutter having a reduced diameter bearing portion, a bushing in said cutter casing for said reduced diameter bearing portion.

4. In a finger nail cutter of the class described, a combination of a motor shaft, a revolving blade cutter in connection therewith, a casing surrounding said revolving cutter having slotted portions therein through which finger nails may be projected, the sidewalls of said casing through which slotted portions extend varying in thickness providing a varying gauge for cutting finger nails to different lengths, said revolving cutter member having helical cutting edges, the outer end of said revolving cutter having a reduced diameter bearing portion, a bushing in said cutter casing for said reduced diameter bearing portion, a cap screw-threaded in connection with the extending end of said casing for holding said bearing in said casing and enclosing the extending end of said casing.

5. In a finger nail cutter of the class described, a motor shaft, rotating blade cutter member in connection therewith, a casing surrounding said rotating cutter having a slotted portion in the sidewall thereof, the thickness of said sidewall varying from its middle portion intermediate opposite ends thereof toward opposite ends.

6. In a finger nail cutter of the class described, a motor shaft, rotating blade cutter member in connection therewith, a casing surrounding said rotating cutter having a slotted portion in the sidewall thereof, the thickness of said sidewall varying from its middle portion intermediate opposite ends thereof toward opposite ends, the thickness of said casing gradually varying to a slightly greater thickness than the middle of the casing sidewall portion, the thickness of the sidewall portion of the casing through which said slot extends at the opposite end of the casing being of still greater thickness.

HARLAN KNOX PERRILL.

REFERENCES CITED

The following references are of record in the file of this patent:

UNITED STATES PATENTS

| Number | Name | Date |
|---|---|---|
| 2,026,630 | Harris | Jan. 7, 1936 |
| 2,098,504 | Mattson et al. | Nov. 9, 1937 |
| 2,289,323 | Dettle | July 7, 1942 |

FOREIGN PATENTS

| Number | Country | Date |
|---|---|---|
| 144,138 | Switzerland | Mar. 2, 1931 |
| 628,752 | Germany | Apr. 15, 1936 |